(12) United States Patent
Mochizuki (10) Patent No.: US 7,283,287 B1
(45) Date of Patent: Oct. 16, 2007

(54) LIGHT SCANNING UNIT, AND IMAGE FORMING APPARATUS USING THE SAME

(75) Inventor: Takeshi Mochizuki, Hitachinaka (JP)

(73) Assignee: Ricoh Printing Systems, Ltd., Tokyo (JP)

(*) Notice: Subject to any disclaimer, the term of this patent is extended or adjusted under 35 U.S.C. 154(b) by 0 days.

(21) Appl. No.: 11/709,249

(22) Filed: Feb. 22, 2007

(30) Foreign Application Priority Data

Mar. 2, 2006 (JP) .............................. 2006-056731

(51) Int. Cl.
*G02B 26/08* (2006.01)

(52) U.S. Cl. ...................................... 359/204; 359/244

(58) Field of Classification Search ...................... None
See application file for complete search history.

(56) References Cited

U.S. PATENT DOCUMENTS

| | | | | |
|---|---|---|---|---|
| 4,390,235 A | * | 6/1983 | Minoura | 359/204 |
| 4,932,734 A | * | 6/1990 | Sakuma et al. | 359/207 |
| 5,550,668 A | * | 8/1996 | Appel et al. | 359/204 |

FOREIGN PATENT DOCUMENTS

| | | |
|---|---|---|
| JP | 63-208021 A | 8/1988 |
| JP | 6-18801 A | 1/1994 |
| JP | 7-248461 A | 9/1995 |

\* cited by examiner

*Primary Examiner*—James Phan
(74) *Attorney, Agent, or Firm*—Crowell & Moring LLP (57) ABSTRACT

The invention is to provide a light scanning unit designed to suppress the quantity of torsion of a light beam caused by an inclination angle of a cylindrical lens disposed between a light source and an optical deflecting element so as to suppress increase in diameter of the beam imaged on a to-be-scanned surface. The object is achieved by the light scanning unit in which a collimator lens, an aperture, a cylindrical lens, a spherical lens, a rotary polygon mirror, an Fθ lens and a to-be-scanned surface are disposed in an optical path between the light source and the optical deflecting element in order of increasing distance from the light source. The light scanning unit is designed to satisfy an expression of $M_r \leq D/\delta$ when $\delta$ designates a diameter of the aperture, D designates a diffraction diameter of each beam focused on the to-be-scanned surface and scanning the to-be-scanned surface, $\gamma$ designates a rotation angle with a generatrix of the cylindrical lens, and $M_r$ designates a conjugate magnification.

4 Claims, 7 Drawing Sheets

LIGHT SCANNING UNIT, AND IMAGE FORMING APPARATUS USING THE SAME

FIELD OF THE INVENTION

The present invention relates to a light scanning unit and an image forming apparatus using the light scanning unit.

DESCRIPTION OF THE BACKGROUND ART

In an optical system of a light scanning unit using a laser as a light source, a laser beam emitted from the laser is collimated by a collimator lens, and a to-be-scanned surface is scanned with the collimated laser beam through a rotary polygon mirror and an Fθ lens, while the laser beam is imaged on the to-be-scanned surface through a cylindrical lens and the Fθ lens.

Recently in a light scanning unit for use in an image forming apparatus or the like, there has been known a fundamental configuration in which a plurality of arrayed light sources are used for increasing the printing speed, and a coupling optics, a cylindrical lens and a spherical lens are disposed between the light sources and an optical deflecting element so that a pupil plane on a posterior focal plane of an imaging optics and the optical deflecting element have a conjugate relationship (for example, see JP-A-63-208021).

Further, due to growing requirements for higher definition in printing quality, enlargement in printing width, higher speed in printing speed, and so on, the imaging performance of optical systems has been severer and severer. The imaging performance of an optical system depends on the machining and assembling accuracies of lenses, mirrors, etc., the aberrations of the lenses and the mirrors, and the diffractions of laser beams. Therefore, not only improvement in machining accuracies of the lenses, the mirrors, etc., but also improvement in the assembling and adjusting accuracies of those are required.

One of factors in causing deterioration of the imaging performance of an optical system is a problem that the diameters of light beams on a to-be-scanned surface are increased because so-called torsion which is a two-dimensional asymmetry occurs in the light beams due to rotation of a cylindrical lens. A solution to this has been disclosed, i.e. by adjustment of the rotation angle of the cylindrical lens with its optical axis as its rotation axis, the quantity of the torsion can be suppressed (for example, see JP-A-7-248461 and JP-A-6-18801).

However, when the rotation angle of the cylindrical lens is adjusted as described in JP-A-7-248461 and JP-A-6-18801, not only is there a problem that a device for adjusting the angle is required, but there is another problem that it takes time to adjust the angle or the number of man-hours in production increases.

SUMMARY OF THE INVENTION

The present invention was developed to solve the forgoing problems belonging to the background art. An object of the invention is to provide a light scanning unit which is designed to suppress the quantity of torsion of a light beam caused by the inclination angle of a cylindrical lens disposed between a light source and an optical deflecting element so as to suppress increase in diameter of the beam imaged on a to-be-scanned surface.

In order to attain the foregoing object, according to a first configuration of the present invention, there is provided a light scanning unit including an optical deflecting element for deflecting a plurality of beams emitted from a light source having a plurality of light outgoing portions, and a scanning optics for focusing the plurality of deflected beams on a to-be-scanned surface and scanning the to-be-scanned surface with the plurality of deflected beams; wherein:

the plurality of light outgoing portions belonging to the light source are arrayed substantially on one straight line, and the straight line is inclined with respect to a plane where the plurality of beams emitted from the plurality of light outgoing portions are deflected to scan;

a coupling optics for forming the beams emitted from the light source into parallel beams, a cylindrical lens having a positive power and having a generatrix in a direction substantially perpendicular to the plane where the beams are deflected to scan, and a spherical lens having a positive power are disposed in an optical path between the light source and the optical deflecting element in order of increasing distance from the light source;

an aperture for limiting diameters of the beams is disposed in a posterior focal plane of the coupling optics;

the cylindrical lens and the spherical lens form an afocal system in the plane where the beams are deflected to scan, and the aperture and the optical deflecting element are disposed in a conjugate relationship in the plane where the beams are deflected to scan;

an anterior focal plane of the spherical lens and the to-be-scanned surface are disposed in a conjugate relationship in the plane where the beams are deflected to scan; and the following expression is satisfied:

$$M_t \leq D/\delta\gamma \qquad (1)$$

when $\delta$ designates a diameter of the aperture in a direction perpendicular to the plane where the beams are deflected to scan, D designates a diffraction diameter of each beam focused on the to-be-scanned surface and scanning the to-be-scanned surface, $\gamma$ designates an angle between the generatrix of the cylindrical lens and a direction perpendicular to the plane where the beams are deflected to scan, and $M_t$ designates a conjugate magnification from the anterior focal plane of the spherical lens to the to-be-scanned surface in the plane where the beams are deflected to scan.

According to a second configuration of the present invention, in the light scanning unit according to the first configuration, the cylindrical lens is not provided with any means for adjusting an angle of the generatrix but has a reference surface perpendicular to the generatrix and an optical axis thereof, so that the cylindrical lens can be attached to a fixed pedestal with the reference surface in contact with the fixed pedestal and without adjusting the angle of the generatrix.

According to a third configuration of the present invention, there is provided an image forming apparatus including a photoconductor, a charging unit for charging the photoconductor, a light scanning unit for optically scanning the photoconductor with light so as to form an electrostatic latent image on the photoconductor in accordance with image information to be recorded, a developing unit for attaching toner to the electrostatic latent image so as to form a toner image, a transfer unit for transferring the toner image onto a recording medium, and a fixation unit for fixing the transferred toner image onto the recording medium; wherein the light scanning unit is a light scanning unit according to the first or second configuration.

According to the present invention, due to use of the aforementioned configurations, the quantity of torsion of a light beam caused by the inclination angle of the cylindrical lens disposed between the light source and the optical deflecting element is suppressed so that the increase of the diameter of the light beam imaged on the to-be-scanned surface can be suppressed.

DETAILED DESCRIPTION OF THE INVENTION

The aforementioned torsion may occur in a cylindrical lens itself. In order to suppress the occurrence of torsion caused by the cylindrical lens itself, researches were carried out. As a result, the present invention was obtained as follows. That is, an aperture for limiting diameters of beams emitted from a light source is disposed between a coupling optics such as a collimator lens for collimating the beams and the cylindrical lens and in a posterior focal plane of the coupling optics. A spherical lens having a positive power is disposed between the cylindrical lens and an optical deflecting element such as a rotary polygon mirror. The cylindrical lens and the spherical lens form an afocal system. The aperture and the optical deflecting element such as a rotary polygon mirror for deflecting the beams emitted from the light source are disposed in a conjugate relationship in the plane where the beams are deflected to scan. An anterior focal plane of the spherical lens having a positive power and disposed in the cylindrical lens and the optical deflecting element and a to-be-scanned surface to be scanned with the deflected beams imaged thereon are disposed in a conjugate relationship in the plane where the beams are deflected to scan. The coupling optics, the aperture, the cylindrical lens, the spherical lens, the optical deflecting element and the to-be-scanned surface are disposed to satisfy the expression $M_r \leq D/\delta\gamma$ when $\delta$ designates a diameter of the aperture, D designates a diffraction diameter of each beam focused on the to-be-scanned surface and scanning the to-be-scanned surface, and $M_r$ designates a conjugate magnification from the anterior focal plane of the spherical lens to the to-be-scanned surface in the plane where the beams are deflected to scan. Thus, the influence given to the beams on the to-be-scanned surface by the rotation angle of the generatrix of the cylindrical lens is reduced so that good imaging performance can be achieved.

An embodiment of a light scanning unit according to the present invention will be described below with reference to the drawings.

Figure 1:
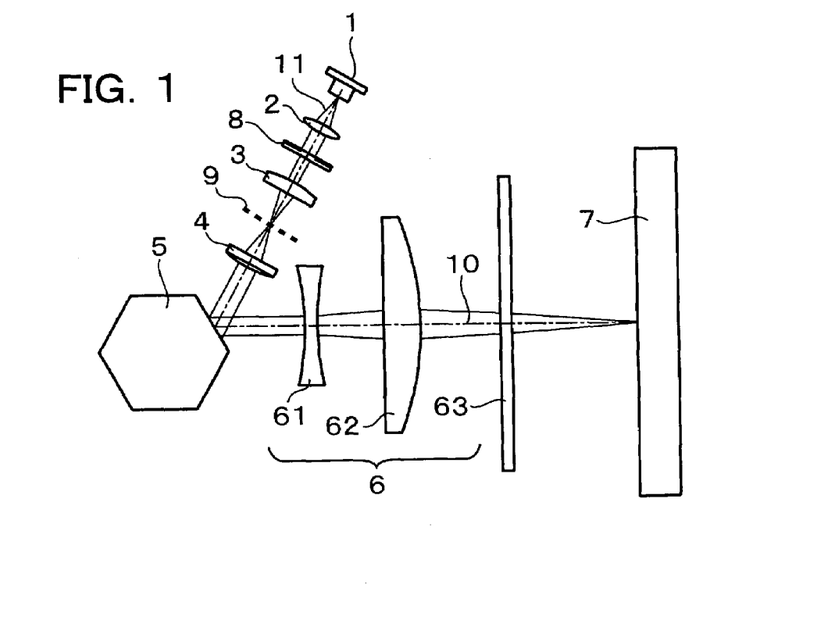
FIG. 1 is a plan view showing a schematic configuration of a light scanning unit according to an embodiment of the present invention.

FIG. 1 is a view showing a schematic configuration of a light scanning unit according to an embodiment of the present invention. In FIG. 1, the reference numeral 1 represents a light source constituted by a semiconductor laser array having two light outgoing portions substantially arrayed in one straight line; 2, a collimator lens serving as the coupling optics; 3, a cylindrical lens having a generatrix in a direction substantially perpendicular to a scanning direction and having a positive power; 4, a spherical lens having a positive power; 5, a rotary polygon mirror having six reflection surfaces and serving as the optical deflecting element; 6, an Fθ lens having a 3-group 3-element configuration of elements 61-63 and serving as the scanning optics; 7, a to-be-scanned surface constituted by a photoconductor drum to be attached to an image forming apparatus; 8, an aperture having a diameter $\delta$; 9, an anterior focal plane of the spherical lens 4 (posterior focal plane of the cylindrical lens 3); 10, a center line of the optical system; and 11, a paraxial ray of a beam. In FIG. 1, for the sake of simplification of the drawing, only one light beam emitted from the light source 1 constituted by the semiconductor laser array having two light outgoing portions substantially arrayed in one straight line is shown, while the other light beam emitted therefrom is not shown.

The beam 11 emitted and diverged from the light source 1 is formed into a beam parallel to the center line 10 of the optical system by the collimator lens 2. The diameter of the beam 11 is limited by the aperture 8, and the beam 11 is converged on the plane 9 by the cylindrical lens 3. The plane 9 and the to-be-scanned surface 7 are disposed in a conjugate relationship with respect to a main-scanning direction. The cylindrical lens 3 and the spherical lens 4 form an afocal system with respect to the main-scanning direction. The diverged beam 11 having passed through the plane 9 is formed into a collimated beam again by the spherical lens 4. The beam 11 is deflected by the rotary polygon mirror 5 while the reflection direction is changed with the rotation of the rotary polygon mirror 5. The deflected beam 11 is converged on the to-be-scanned surface 7 again by the Fθ lens 6, and focused thereon. Thus, a scanning line is formed on the to-be-scanned surface 7 in accordance with the light emitted from the light source 1.

In this embodiment, assume that the cylindrical lens 3 is disposed in the state where the angle of the generatrix of the cylindrical lens 3 is turned when the scanning line is formed.

In this case, the diameter of the scanning beam may be increased in the main-scanning direction on the to-be-scanned surface 7. Increase in the diameter of the scanning beam can be suppressed if the cylindrical lens 3 is disposed in a specific layout. This point will be described with reference to FIGS. 2 to 8.

First, formation of a scanning line when the angle of the generatrix of the cylindrical lens 3 is not turned will be described with reference to FIGS. 2 to 5.

FIGS. 2 to 5 show the outline of the configuration of the optical system between the light source 1 and the to-be-scanned surface 7. In FIGS. 2 to 5, parts having the same configurations as those in FIG. 1 are given the same reference numerals correspondingly. The reference numeral 12 represents a paraxial ray of a beam emitted from the other light outgoing portion of the light source 1. The two light outgoing portions of the light source 1 are substantially arrayed in one straight line. The straight line is disposed to be inclined at a small angle with respect to the plane where the beams 11 and 12 are deflected to scan. In FIGS. 2 to 5, the reference numeral 5 represents only a reflection surface of the rotary polygon mirror 5.

Further, in the drawings and description about this embodiment, a Z-axis is set in parallel to the center line 10 of the optical system within a plane where the beams should be deflected to scan, an X-axis is set perpendicularly to the center line 10 of the optical system within the plane where the beams should be deflected to scan, and a Y-axis is set perpendicularly to the Z-axis and the X-axis. In this specification, a direction parallel to the X-axis will be referred to as a main-scanning direction, a direction parallel to the Y-axis will be referred to as a sub-scanning direction, an XZ plane will be referred to as a main-scanning plane, and a YZ plane will be referred to as a sub-scanning plane.

Figure 2:
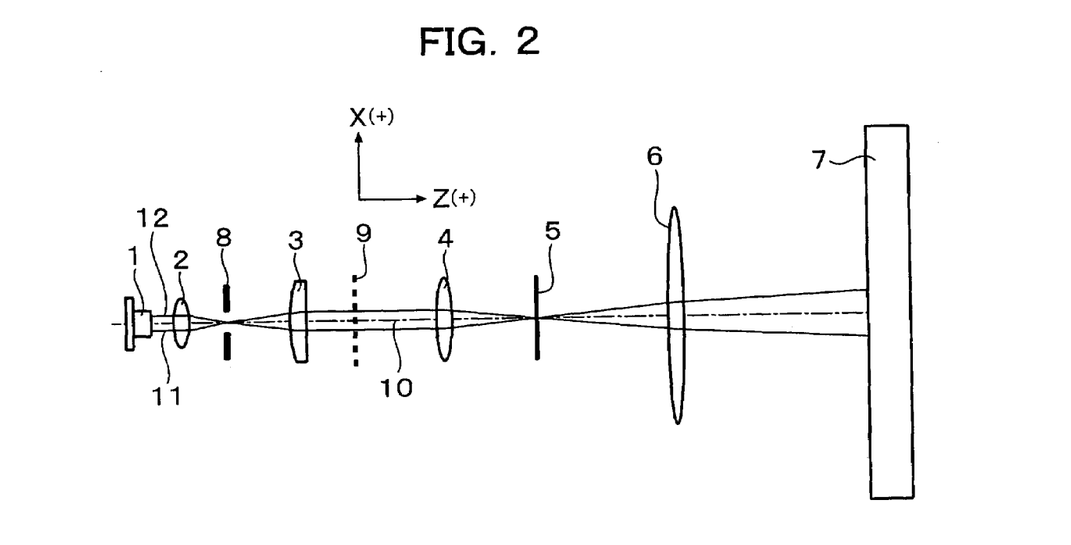
FIG. 2 is a view showing the relationship between the layout of optical elements and the paraxial rays of light beams 11 and 12 viewed on a main-scanning surface of the light scanning unit shown in FIG. 1.

FIG. 2 is a view in the plane (main-scanning plane) where a beam of a chief ray is deflected to scan.

The beams 11 and 12 emitted from the semiconductor laser 1 are refracted by the collimator lens 2. The refracted beams 11 and 12 cross each other on the center line 10 of the optical system in the aperture 8 disposed in the posterior focal plane of the collimator lens 2. Since the aperture 8 and the rotary polygon mirror 5 are disposed in a conjugate relationship with respect to the main-scanning direction, the beams 11 and 12 passing through the aperture 8 are transmitted through the cylindrical lens 3 and the spherical lens 4 so as to cross each other again in the rotary polygon mirror 5. After that, due to refraction by the Fθ lens 6, the beams 11 and 12 reach the to-be-scanned surface 7 at a specific distance from each other.

As is apparent from FIG. 2, the beams 11 and 12 are located in different coordinates in the X-axis on the light source 1. Accordingly, the traveling directions of the beams transmitted through the collimator lens 2 are refracted to cross each other in the aperture 8. After passing through the aperture 8, the beams 11 and 12 is made to cross each other again in the rotary polygon mirror 5 by the cylindrical lens 3 and the spherical lens 4. Thus, the beams 11 and 12 are diverged.

In order to suppress the dimensions of the rotary polygon mirror 5 to a required minimum, it is desired to make the positions of the beams 11 and 12 coincide with each other. To this end, the aperture 8 and the rotary polygon mirror 5 are disposed in a conjugate relationship with respect to the main-scanning direction so as to cross the beams 11 and 12 on the rotary polygon mirror 5. Thus, the positions of the beams 11 and 12 are made to coincide with each other in the rotary polygon mirror 5.

Figure 3:
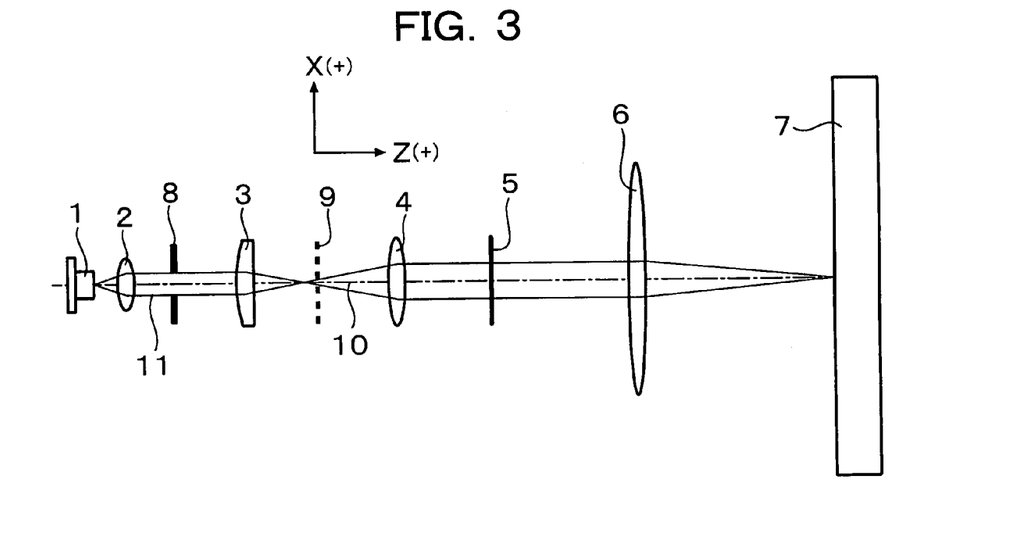
FIG. 3 is a view showing the relationship between the layout of the optical elements and the paraxial ray of the light beam 11 viewed on the main-scanning surface of the light scanning unit shown in FIG. 1.

FIG. 3 shows the paraxial rays of the beams 11 and 12 on the main-scanning plane. Since the beams 11 and 12 are similar to each other, the beam 11 is shown as representative. The diverged beam 11 emitted from the light source 1 is formed into a beam parallel to the center line 10 of the optical system by the collimator lens 2. The diameter of the beam 11 is limited to 6 by the aperture 8 whose diameter is 6. The beam 11 is converged on the plane 9 by the cylindrical lens 3. The plane 9 and the to-be-scanned surface 7 are disposed in a conjugate relationship with respect to the main-scanning direction. Accordingly, the diverged beam 11 having passed through the plane 9 is transmitted through the spherical lens 4 and the Fθ lens 6 so as to be converged again and focused on the to-be-scanned surface 7.

Figure 4:
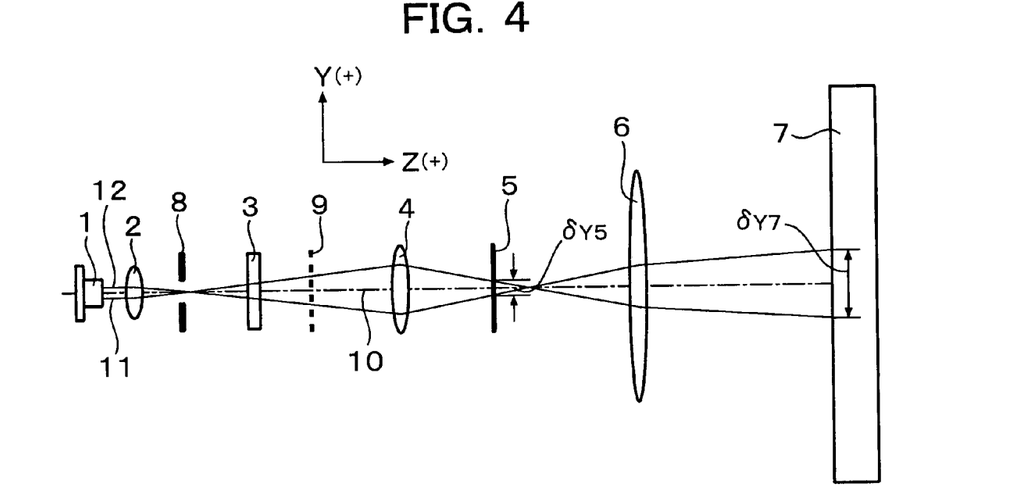
FIG. 4 is a view showing the relationship between the layout of the optical elements and the paraxial rays of the light beams 11 and 12 viewed on a sub-scanning surface of the light scanning unit shown in FIG. 1.

FIG. 4 shows the chief rays of the beams 11 and 12 on the sub-scanning plane. The beams 11 and 12 emitted from the semiconductor laser 1 are refracted by the collimator lens 2. The two beams 11 and 12 cross each other in the aperture 8 disposed in the posterior focal plane of the collimator lens 2. Since the cylindrical lens 3 has no effect on the sub-scanning direction, there is no change in the traveling directions of the beams 11 and 12 between before and after the beams 11 and 12 are transmitted through the cylindrical lens 3. Thus, due to refraction by the spherical lens 4, the beams 11 and 12 are at a specific distance $\delta_{Y5}$ from each other on the rotary polygon mirror 5. Due to a conjugate relationship between the rotary polygon mirror 5 and the photoconductor drum 7, a distance $\delta_{Y7}$ between the beams 11 and 12 on the to-be-scanned surface 7 is a value obtained by multiplying the distance $\delta_{Y5}$ by a conjugate magnification. The beams 11 and 12 are also focused in positions at a predetermined distance from each other on the sub-scanning plane.

Figure 5:
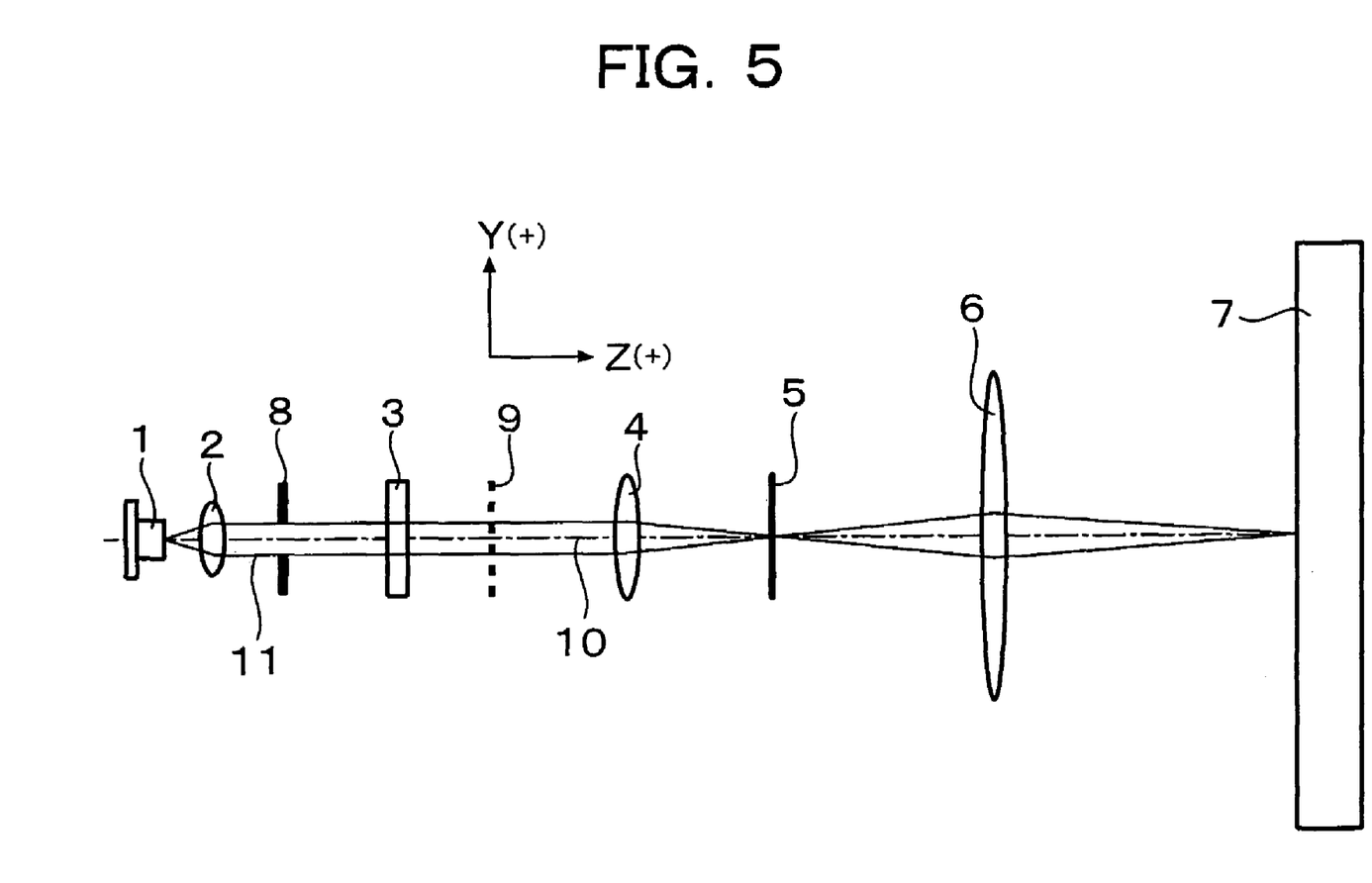
FIG. 5 is a view showing the relationship between the layout of the optical elements and the paraxial ray of the light beam 11 viewed on the sub-scanning surface of the light scanning unit shown in FIG. 1.

FIG. 5 shows the paraxial rays of the beams 11 and 12 on the sub-scanning plane. Since the beams 11 and 12 are similar to each other, the beam 11 is shown as representative. The diverged beam 11 emitted from the light source 1 is formed into a beam parallel to the center line 10 of the optical system by the collimator lens 2. The beam 11 is converged on the rotary polygon mirror 5 by the spherical lens 4. The rotary polygon mirror 5 and the to-be-scanned surface 7 are disposed in a conjugate relationship with respect to the sub-scanning direction. Accordingly, the beam 11 diverged from the rotary polygon mirror 5 is transmitted through the Fθ lens 6 so as to be converged again and focused on the photoconductor drum surface 7.

The state where a scanning line is formed when the angle of the generatrix of the cylindrical lens 3 is not turned has been described above. The case where the angle of the generatrix of the cylindrical lens 3 is turned will be described with reference to FIGS. 6A-6C, FIGS. 7A-7C and FIG. 8.

Figure 6A:
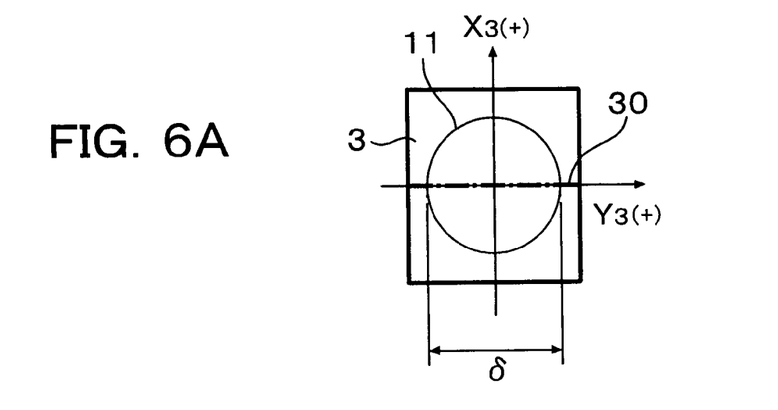
FIGS. 6A-6C are views for explaining the relationship about the inclination of a generatrix of a cylindrical lens, FIG. 6A being a view from the light beam incoming side of the cylindrical lens, FIG. 6B being a view from above FIG. 6A, FIG. 6C being a view showing the relationship about an image focused on a plane 9.
Figure 6B:
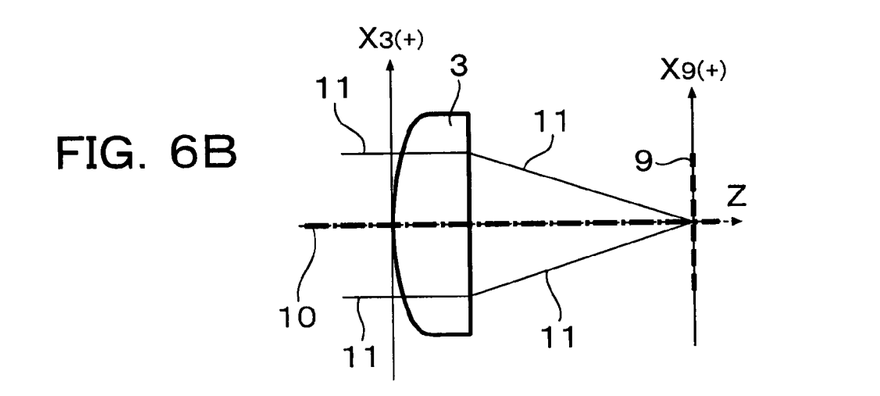
Figure 6C:
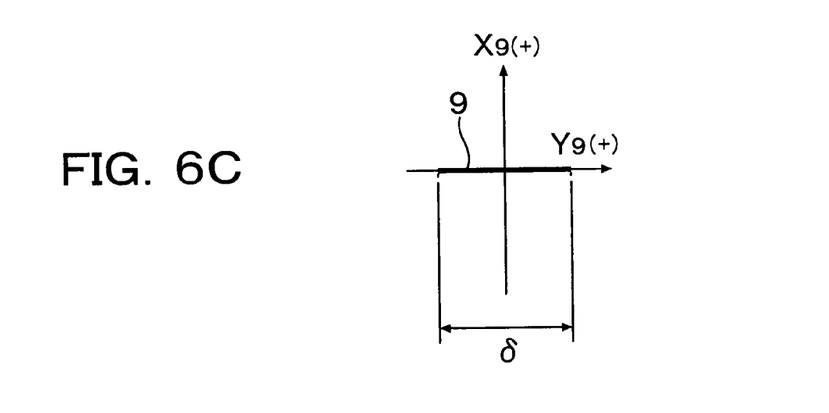
Figure 7A:
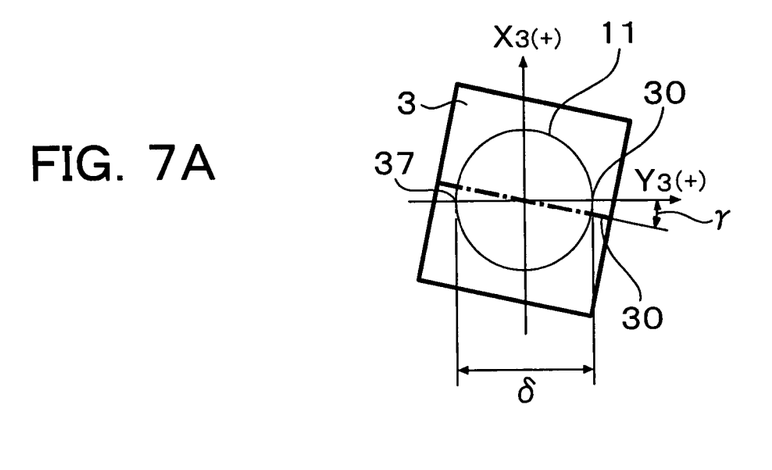
FIGS. 7A-7C are views for explaining the relationship about the inclination of the generatrix of the cylindrical lens, FIG. 7A being a view from the light beam incoming side of the cylindrical lens, FIG. 7B being a view from above FIG. 7A, FIG. 7C being a view showing the relationship about an image focused on the plane 9.
Figure 7B:
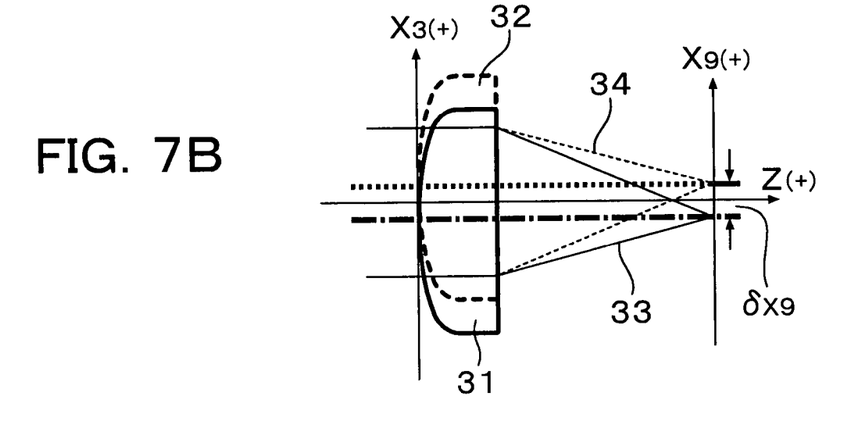
Figure 7C:
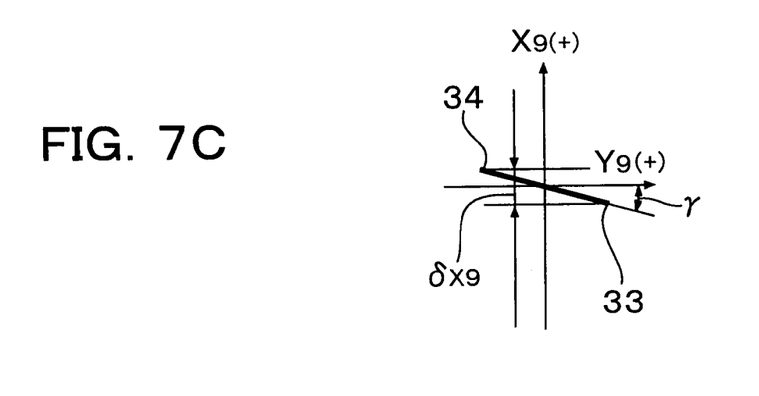

FIGS. 6A-6C and 7A-7C show the relationship of influence of an angle γ between the generatrix of the cylindrical lens 3 and the Y-axis corresponding to the sub-scanning direction. FIGS. 6A-6C show the case where the generatrix of the cylindrical lens 3 is not turned. FIGS. 7A-7C show the case where the generatrix of the cylindrical lens 3 is turned by the angle γ.

FIG. 6A shows the cylindrical lens 3 viewed from the beam incoming side irradiated with the beam 11 whose diameter is δ. In FIG. 6A, the reference numeral 30 represents the generatrix of the cylindrical lens 3. Coordinate axes $X_3$ and $Y_3$ are set in a tangent plane of the beam incoming side of the cylindrical lens 3 on the center line 10 of the optical system. The coordinate axis $X_3$ designates the scanning direction, and the coordinate axis $Y_3$ designates the sub-scanning direction, showing (+) on their plus sides respectively. The generatrix 30 is parallel to the coordinate axis $Y_3$.

FIG. 6B shows the cylindrical lens 3 and the plane 9 on the scanning plane. A coordinate axis $X_9$ is set in the scanning direction on the plane 9. A beam whose width is limited to δ in the sub-scanning direction by the aperture 8 is incident on the cylindrical lens 3, refracted, and converged on the plane 9.

FIG. 6C shows the plane 9 viewed from the beam incoming side. Coordinate axes $X_9$ and $Y_9$ are set on the plane 9. The coordinate axis $X_9$ designates the scanning direction, and the coordinate axis $Y_9$ designates the sub-scanning direction, showing (+) on their plus sides respectively. Since the cylindrical lens 3 has no power in the sub-scanning direction, there is no change in the width δ in the sub-scanning direction. Thus, the beam has a shape extending in parallel to the coordinate axis $Y_9$.

FIG. 7A shows the cylindrical lens viewed from the beam incoming side. The cylindrical lens 3 is rotated so that the generatrix 30 has an angle γ with respect to the coordinate axis $Y_3$. Accordingly, the generatrix is located in the (−) portion of the coordinate axis $X_3$ in the (+) portion of the coordinate axis $Y_3$ and located in the (+) portion of the coordinate axis $X_3$ in the (−) portion of the coordinate axis $Y_3$.

FIG. 7B shows the cylindrical lens 3 and the plane 9 within the scanning plane. In FIG. 7B, the reference numeral 31 represents the cylindrical lens in the (+) portion of the coordinate axis $Y_3$, and 32 represents the cylindrical lens in the (−) portion of the coordinate axis $Y_3$. FIG. 7B shows the state where the cylindrical lens is shifted in the direction of the coordinate axis $X_3$ in accordance with change in the $Y_3$ coordinate. The reference numeral 33 represents a beam transmitted through the cylindrical lens 31, and 34 represents a beam transmitted through the cylindrical lens 32.

The beams 33 and 34 are refracted by the cylindrical lenses 31 and 32 respectively so as to be converged on the plane 9. The positions where the beams 33 and 34 are converged are on the extension of the generatrix 30. There is a difference in position on the coordinate axis $X_9$ between the beam 33 having passed through the (+) portion of the coordinate axis $Y_3$ and the beam 34 having passed through the (−) portion of the coordinate axis $Y_3$. Thus, the beams 33 and 34 are at a distance $\delta_{X9}$ from each other.

FIG. 7C shows the plane 9 viewed from the beam incoming side. The beam has a shape extending at an angle γ with respect to the coordinate axis $Y_9$. The distance $\delta_{X9}$ in the X-axis direction between the beam 33 and the beam 34 can be expressed by Expression (2) on the assumption that γ is small.

$$\delta_{X9} = \delta\gamma \tag{2}$$

Figure 8:
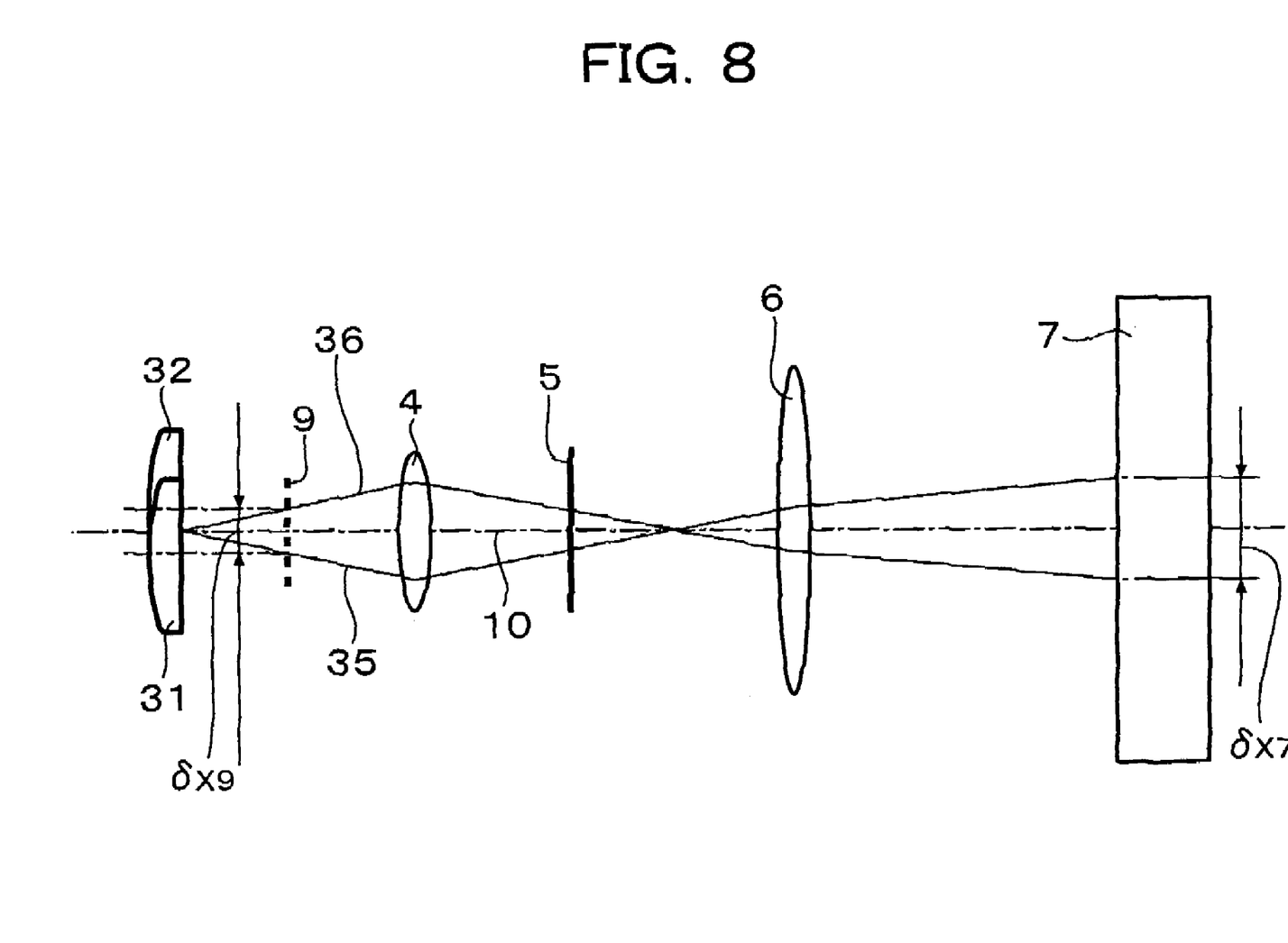
FIG. 8 is a view showing the relationship about refraction of a paraxial ray in an outermost edge portion of a light beam within a scanning plane between the cylindrical lens and a to-be-scanned surface when a cylindrical lens having an inclined generatrix is used as the cylindrical lens.

FIG. 8 shows beams within the scanning plane between the cylindrical lens 3 and the to-be-scanned surface 7. In FIG. 8, the reference numeral 35 represents a ray having passed through a position 38 in FIG. 7A among the beam transmitted through the cylindrical lens 31 on the (+) portion of the coordinate axis $Y_3$, and 36 represents a ray having passed through a position 37 in FIG. 7A among the beam transmitted through the cylindrical lens 32 on the (−) portion of the coordinate axis $Y_3$. The distance on the plane 9 is $\delta_{X9}$. The plane 9 and the to-be-scanned surface 7 have a conjugate relationship with respect to the magnification $M_t$. Accordingly, the distance $\delta_{X7}$ between the beam 35 and the beam 36 on the to-be-scanned surface 7 is expressed by Expression (3).

$$\delta_{X7} = M_t \delta_9 \tag{3}$$

When the quantity of torsion of a beam on the to-be-scanned surface 7 is beyond a diffractive diameter D, the diameter of the beam focused thereon may increase. In consideration of this, Expression 1 can be obtained from Expression (2) and Expression (3). Here, the diffractive diameter D is expressed by $D = (4\lambda/\pi) \cdot F$ when λ designates the wavelength of the beam, and F designates the F number.

$$M_t \leq D/\delta\gamma \tag{1}$$

From above, it is apparent that when the magnification $M_t$ and the diameter δ of the aperture 8 are selected to satisfy Expression (1), the quantity of torsion of the beam can be suppressed within an allowable range even if the generatrix of the cylindrical lens 3 is turned at the angle γ. Thus, increase in diameter of the beam focused on the to-be-scanned surface can be suppressed.

Next, Table 1 shows dimensions of optical elements in the light scanning unit shown in FIG. 1. The reference signs a to c in Table 1 designate refraction surfaces of the collimator lens 2 having a one-group two-element configuration; d, the aperture 8; e and f, refraction surfaces of the cylindrical lens 3; g and h, refraction surfaces of the spherical lens 4; i, a reflection surface of the rotary polygon mirror 5; j to o, refraction surfaces of three lenses 61 to 63 constituting the Fθ lens 6; and p, the to-be-scanned surface. The refraction surface m can be obtained by the following Expressions (4) to (6) when R (mm) designates the curvature radius in the main-scanning direction, r (mm), the curvature radius in the sub-scanning direction; X, the main-scanning direction; Y, the sub-scanning direction; and Z, the optical axis direction.

TABLE 1

| surface number | sub-scanning direction curvature radius r (mm) | main-scanning direction curvature radius R (mm) | spacing (mm) | refractive index |
|---|---|---|---|---|
|   | ∞ |   | 6.9 |   |
| a | 8.25 |   | 4.5 | 1.591 |
| b | 2.93 |   | 6.0 | 1.513 |
| c | −7.89 |   | 6.7 | 1.0 |
| d | ∞ |   | 50 | 1.0 |
| e | ∞ | 25.7 | 3 | 1.513 |
| f | ∞ |   | 146 | 1.0 |
| g | ∞ |   | 3 | 1.513 |
| h | −51.3 |   | 100 | 1.0 |
| i | ∞ |   | 23.4 | 1.0 |
| j | −514 |   | 17.9 | 1.513 |
| k | 884 |   | 210.9 | 1.0 |
| l | ∞ |   | 7 | 1.718 |
| m | −54.95 | −153 | 214 | 1.0 |
| n | 116 | ∞ | 7 | 1.498 |
| o | −116 | ∞ | 54.8 | 1.0 |
| p | 100 | ∞ |   |   |

$$Z = f_0(X, Y) + f_2(X, Y) \tag{4}$$

Here, $f_0(X, Y)$ designates a fundamental toric shape, and $f_2(X, Y)$ designates an additional function which is rotation-asymmetric. A section on XZ plane in a local coordinate system using an intersection with the optical axis as origin is expressed by the following Expression (5). The section is rotation-symmetric with respect to an axis which is on the XZ plane, in parallel to the X-axis and at a distance r from the origin along the Z-axis.

$$f_0(X, Y) = (X^2/R)/\left(1 + \sqrt{1 - (X/R)^2}\right) \tag{5}$$

Thus, a section on the YZ plane is a circle whose curvature radius is r. $f_2(X, Y)$ is expressed by the following Expression (6).

$$f_2(X, Y) = \Sigma P_{lm} X^l Y^m \tag{6}$$

Here, $P_{lm}$ designates a constant.

The coefficients of the additional function for the surface number m are $P_{12}=-1.4E-6$ and $P_{22}=7.74E-7$.

The number of faces of the rotary polygon mirror 5 is six, the radius of an inscribed circle thereof is 32 mm, and the angle of incidence of a beam is 1.19 radians.

The other dimensions are shown in Table 2.

TABLE 2

| | |
|---|---|
| wavelength | 680 nm |
| diffractive diameter (D) of beam on to-be-scanned surface | 60 µm |
| main-scanning direction width of aperture | 2.3 mm |
| sub-scanning direction width (δ) of aperture | 2.3 mm |
| focal length of collimator lens | 11.2 mm |
| focal length of cylindrical lens | 57.5 mm |
| focal length of spherical lens | 100 mm |
| main-scanning direction focal length of Fθ lens | 280 mm |
| sub-scanning direction conjugate magnification of Fθ lens | 1.58 |
| conjugate magnification ($M_t$) between anterior focal plane of spherical lens and to-be-scanned surface | 2.8 |
| rotation angle (γ) (radian) with respect to generatrix of cylindrical lens | $0.87 \times 10^{-2}$ (0.5 degrees) |

The value of Expression (1) can be obtained from these dimensions as:

$$D/\delta\gamma = 60\times10^{-3}/2.3\times0.874\times10^{-2} = 2.998$$

Figure 9:
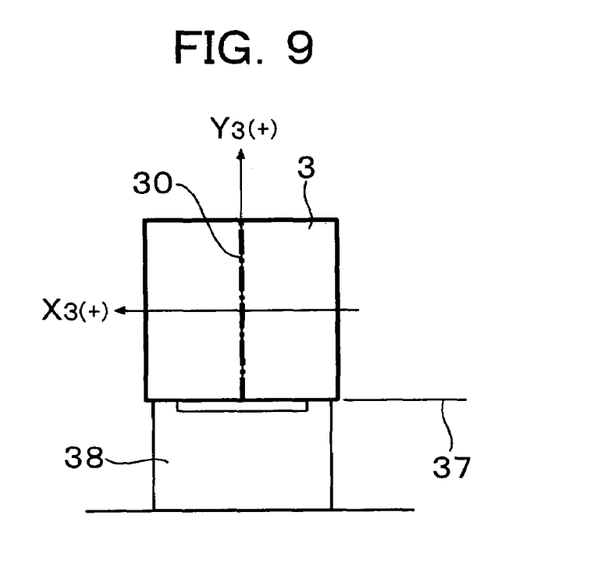
FIG. 9 is a plan view where the cylindrical lens is attached to a pedestal.

The value is larger than $M_t=2.8$. The relationship $M_t \leq D/\delta\gamma$ in Expression (1) is satisfied obviously. Accordingly, when the rotation angle γ of the generatrix of the cylindrical lens 3 is $0.874\times10^{-2}$, that is, about 0.5, imaging can be performed properly. Based on this, when $M_t$ and δ are selected properly, the quantity of torsion of a beam can be suppressed within an allowable range even if the cylindrical lens 3 is disposed to be rotated to some extent. It is therefore unnecessary to adjust the rotation angle of the cylindrical lens 3. Thus, as shown in FIG. 9, the cylindrical lens 3 is not provided with any particularly special mechanism for adjusting the angle of the generatrix 30 but can use a simple structure where the cylindrical lens 3 is attached to a fixed pedestal 38 so that a reference surface 37 perpendicular to the optical axis and the generatrix 30 of the cylindrical lens 3 abuts on the fixed pedestal 38. As a result, cost can be saved greatly.

Figure 10:
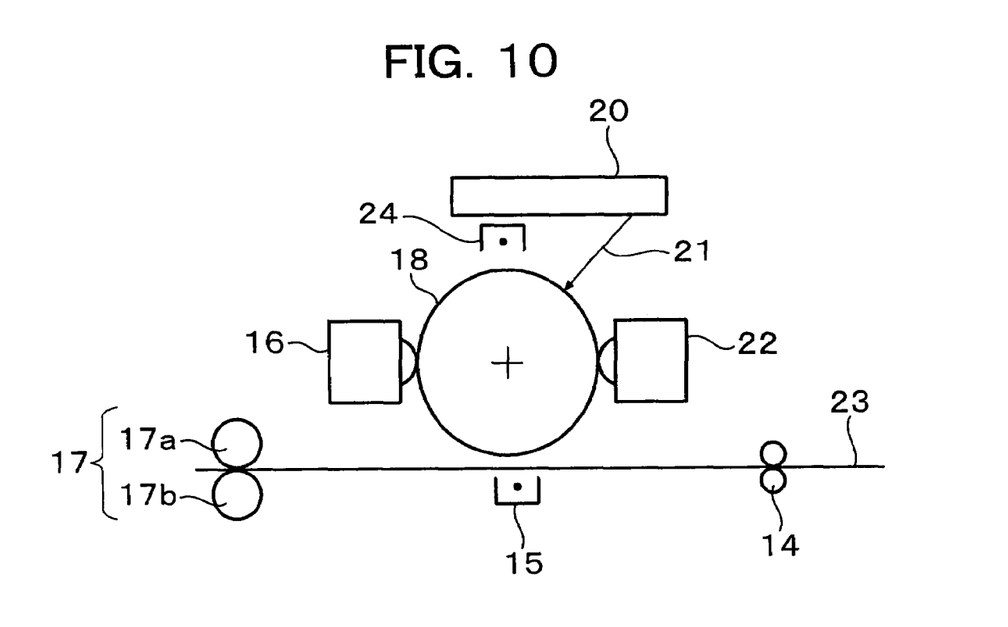
FIG. 10 is a view showing a schematic configuration of an image forming apparatus according to an embodiment of the invention.

Further, an image forming apparatus according to an embodiment of the invention using the light scanning unit according to the aforementioned embodiment will be described with reference to FIG. 10. FIG. 10 is a diagram showing a schematic configuration of the image forming apparatus according to the embodiment of the invention.

A drum-like photoconductor 18 for forming a toner image is driven to rotate at a constant peripheral velocity by a not-shown motor. The photoconductor 18 is charged uniformly into a specific polarity by a charging unit 24, and then exposed to a light ray 21 from the light scanning unit 20 according the aforementioned embodiment of the invention. Thus, an electrostatic latent image corresponding to image information to be recorded is formed. A developing unit 22 is disposed on the rotation-direction downstream side of the exposure position. A toner image is formed on the photoconductor 18 by the developing unit 22.

Printing paper 23 serving as a recording medium is conveyed by a conveyance unit 14 such as a conveyance roller pair. The back surface of the printing paper 23 is charged into a polarity opposite to that of toner by a transfer unit 15. Thus, the toner image on the photoconductor 18 is transferred onto the printing paper 23. After the transfer, residual toner which has not been transferred is removed by a cleaning unit 16. The printing paper 23 to which the toner image is transferred from the photoconductor 18 is conveyed to a fixing unit 17.

The fixing unit 17 is constituted by a heat roller 17a controlled to be heated to a constant temperature, and a pressure roller 17b brought into pressure contact with the heat roller 17a. When the printing paper 23 passes through the fixing unit 17, the toner image held on the printing paper 23 is pressed and melted to be thereby fixed onto the printing paper 23. After the fixation, the printing paper 23 is discharged to the outside of the image forming apparatus, and stocked.

The light scanning unit used in the image forming apparatus is a light scanning unit according to the aforementioned embodiment of the invention shown in FIG. 1, where a beam emitted from the Fθ lens 6 is refracted at a predetermined angle by a reflecting mirror so as to form the ray 21 shown in FIG. 10, and then imaged on the to-be-scanned surface 7 of the photoconductor 18.

Since the image forming apparatus according to this embodiment uses the light scanning unit according to the aforementioned embodiment, it is possible to provide an image forming apparatus which can achieve higher printing definition and higher printing speed at lower cost.

The invention is applicable especially effectively to requirements for higher definition, higher printing speed, etc. in an image forming apparatus such as a laser printer.

What is claimed is:

1. A light scanning unit comprising:

an optical deflecting element for deflecting a plurality of beams emitted from a light source having a plurality of light outgoing portions; and a scanning optics for focusing the plurality of deflected beams on a to-be-scanned surface and scanning the to-be-scanned surface with the plurality of deflected beams; wherein:

the plurality of light outgoing portions belonging to the light source are arrayed substantially on one straight line, and the straight line is inclined with respect to a plane where the plurality of beams emitted from the plurality of light outgoing portions are deflected to scan;

a coupling optics for forming the beams emitted from the light source into parallel beams, a cylindrical lens having a positive power and having a generatrix in a direction substantially perpendicular to the plane where the beams are deflected to scan, and a spherical lens having a positive power are disposed in an optical path between the light source and the optical deflecting element in order of increasing distance from the light source;

an aperture for limiting diameters of the beams is disposed in a posterior focal plane of the coupling optics;

the cylindrical lens and the spherical lens form an afocal system in the plane where the beams are deflected to scan, and the aperture and the optical deflecting element are disposed in a conjugate relationship in the plane where the beams are deflected to scan;

an anterior focal plane of the spherical lens and the to-be-scanned surface are disposed in a conjugate relationship in the plane where the beams are deflected to scan; and the following expression is satisfied:

$$M_t \leq D/\delta\gamma \qquad (1)$$

when δ designates a diameter of the aperture in a direction perpendicular to the plane where the beams are deflected to scan, D designates a diffraction diameter of each beam focused on the to-be-scanned surface and scanning the to-be-scanned surface, γ designates an angle between the generatrix of the cylindrical lens and a direction perpendicular to the plane where the beams are deflected to scan, and $M_t$ designates a conjugate magnification from the anterior focal plane of the spherical lens to the to-be-scanned surface in the plane where the beams are deflected to scan.

2. A light scanning unit according to claim 1, wherein:
the cylindrical lens is not provided with any means for adjusting an angle of the generatrix but has a reference surface perpendicular to the generatrix and an optical axis thereof, so that the cylindrical lens can be attached to a fixed pedestal with the reference surface in contact with the fixed pedestal and without adjusting the angle of the generatrix.

3. An image forming apparatus comprising:
a photoconductor;
a charging unit for charging the photoconductor;
a light scanning unit for optically scanning the photoconductor with light so as to form an electrostatic latent image on the photoconductor in accordance with image information to be recorded;
a developing unit for attaching toner to the electrostatic latent image so as to form a toner image;
a transfer unit for transferring the toner image onto a recording medium; and
a fixation unit for fixing the transferred toner image onto the recording medium;
wherein the light scanning unit is a light scanning unit according to claim 1.

4. An image forming apparatus comprising:
a photoconductor;
a charging unit for charging the photoconductor;
a light scanning unit for optically scanning the photoconductor with light so as to form an electrostatic latent image on the photoconductor in accordance with image information to be recorded;
a developing unit for attaching toner to the electrostatic latent image so as to form a toner image;
a transfer unit for transferring the toner image onto a recording medium; and
a fixation unit for fixing the transferred toner image onto the recording medium;
wherein the light scanning unit is a light scanning unit according to claim 2.

* * * * *